(12) United States Patent
Doi et al.

(10) Patent No.: US 9,569,448 B2
(45) Date of Patent: *Feb. 14, 2017

(54) OPERATING TECHNIQUES FOR A STORAGE NETWORK SYSTEM

(71) Applicant: INTERNATIONAL BUSINESS MACHINES CORPORATION, Armonk, NY (US)

(72) Inventors: Munehiro Doi, Kanagawa (JP); Hiroki Nakano, Shiga (JP); Hitoshi Nishino, Kanagawa-ken (JP); Shinya Takasaka, Kanagawa (JP)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/734,677

(22) Filed: Jun. 9, 2015

(65) Prior Publication Data

US 2015/0373113 A1    Dec. 24, 2015

Related U.S. Application Data

(63) Continuation of application No. 14/367,082, filed as application No. PCT/JP2012/075323 on Oct. 1, 2012.

(30) Foreign Application Priority Data

Dec. 20, 2011  (JP) .................................. 2011-277801

(51) Int. Cl.
G06F 17/30    (2006.01)
H04L 29/08    (2006.01)
(Continued)

(52) U.S. Cl.
CPC ....... *G06F 17/30091* (2013.01); *G08G 1/0112* (2013.01); *H04L 67/02* (2013.01);
(Continued)

(58) Field of Classification Search
None
See application file for complete search history.

(56) References Cited

U.S. PATENT DOCUMENTS 6,611,755 B1 * 8/2003 Coffee .................... B28C 5/422
                                                  340/438
7,715,961 B1 * 5/2010 Kargupta ............... G06Q 10/08
                                                  303/152
(Continued)

FOREIGN PATENT DOCUMENTS

JP      0895999 A     4/1996
JP      0981332 A     3/1997
(Continued)

OTHER PUBLICATIONS

Dhar, et al., "Smart Antenna Based Broadband communication in Intelligent Transportation system," NCEEERE 2008, Sikkim Manipal Institute of Technology, Sikkim—737 132, 2008, India, 4 pages.

(Continued)

*Primary Examiner* — Richard Bowen
(74) *Attorney, Agent, or Firm* — Mark G. Edwards (57) ABSTRACT

A technique for operating a storage network system includes storing, at one or more of a plurality of data collection storages arranged along a traveling path of a mobile body, data records received from the mobile body. An acknowledge (ACK) record including a storage identifier (ID) is transmitted, from the one or more of the plurality of data collection storages to the mobile body, in response to receiving the data records. Communication between a user storage and the one or more of the plurality of data collection storages is established via a communication network that is configured to receive the ACK record and receive and store at least one of the data records from the one or more of the
(Continued)

data collection storages that is identified by the storage ID in the received ACK record.

8 Claims, 5 Drawing Sheets

(51) Int. Cl.
  *G08G 1/01* (2006.01)
  *H04W 4/04* (2009.01)
(52) U.S. Cl.
  CPC .......... *H04L 67/1097* (2013.01); *H04L 67/12* (2013.01); *H04W 4/046* (2013.01)

(56) References Cited

U.S. PATENT DOCUMENTS

| | | | | |
|---|---|---|---|---|
| 8,140,358 B1* | 3/2012 | Ling | ...................... | G06Q 40/08 340/439 |
| 2008/0077290 A1* | 3/2008 | Weinmann | .............. | G07C 5/008 701/33.4 |
| 2012/0004804 A1* | 1/2012 | Beams | .................. | G01S 5/0027 701/32.7 |
| 2012/0041637 A1* | 2/2012 | Allemang | .............. | G07C 5/008 701/31.5 |
| 2012/0046981 A1* | 2/2012 | Wellman | .............. | G05D 1/0282 705/7.12 |
| 2012/0124183 A1* | 5/2012 | Long | .................... | G06F 3/0622 709/219 |
| 2013/0302758 A1* | 11/2013 | Wright | .................. | G07C 5/008 434/65 |
| 2014/0351295 A1 | 11/2014 | Doi et al. | | |

FOREIGN PATENT DOCUMENTS

| | | |
|---|---|---|
| JP | 11205860 A | 7/1999 |
| JP | 11298940 A | 10/1999 |
| JP | 2000041957 A | 2/2000 |
| JP | 2001327472 A | 11/2001 |
| JP | 2002271835 A | 9/2002 |
| JP | 2003248625 A | 9/2003 |
| JP | 3988485 B2 | 10/2007 |
| JP | 2009093591 A | 4/2009 |
| JP | 2009104415 A | 5/2009 |
| JP | 2010163947 A | 7/2010 |
| JP | 5680220 B2 | 3/2015 |
| WO | 03025881 A1 | 3/2003 |

OTHER PUBLICATIONS

Van Leeuwen, et al., "Broadband Wireless Communication in Vehicles," Journal of the Communications Network 2: 77-82, 2003, Belgium, 6 pages.

Doi et al., International Application No. PCT/JP2012/075323, International Search Report and Written Opinion dated Dec. 11, 2012, 8 pages.

Yasuhiro et al., "Practical Realization of ITS Spot Services", Special Reports, 2011, vol. 66, No. 2, 4 pages, English Abstract. http://www.toshiba.co.jp/tech/review/2011/02/66_02pdf/a07.pdf.

Kunihiko, T., "Internet ITS", NEC Technical Journal, vol. 3, No. 1, Jan. 2008, 5 pages. http://jpn.nec.com/techrep/journal/g08/n01/pdf/080111.pdf.

Unknown, "EV&ITS", Japan, Nagasaki, 2011, English Translation, 2 pages.

Unknown "Internet ITS Research and Development Report 2005", English Translation, Keio University Internet ITS Joint Research Group, Jun. 2002, 218 pages.

* cited by examiner

| Mark | H | P | T | Data |
|---|---|---|---|---|
| DATA | 2001:db8::1 | 35.634, 139.879 | 20111125T151800 | xxx |
| DATA | 2001:db8::1 | 35.633, 139.883 | 20111125T151802 | yyy |
| DATA | 2001:db8::1 | 35.630, 139.884 | 20111125T151803 | zzz |
|  |  |  |  |  |

(b)

| Mark | H | P | T | R |
|---|---|---|---|---|
| ACK | 2001:db8::1 | 35.628, 139.888 | 20111125T151805 | 2001:db8::2 |
| ACK | 2001:db8::1 | 35.625, 139.889 | 20111125T151812 | 2001:db8::3 |
| ACK | 2001:db8::1 | 35.623, 139.892 | 20111125T151834 | 2001:db8::4 |
|  |  |  |  |  |

(c)

| Mark | H | P | T | Data / R |
|---|---|---|---|---|
| DATA | 2001:db8::1 | 35.634, 139.879 | 20111125T151800 | xxx |
| DATA | 2001:db8::1 | 35.633, 139.883 | 20111125T151802 | yyy |
| ACK | 2001:db8::1 | 35.628, 139.888 | 20111125T151805 | 2001:db8::2 |
| ACK | 2001:db8::1 | 35.625, 139.889 | 20111125T151812 | 2001:db8::3 |
| ACK | 2001:db8::1 | 35.623, 139.892 | 20111125T151834 | 2001:db8::4 |
|  |  |  |  |  |

OPERATING TECHNIQUES FOR A STORAGE NETWORK SYSTEM

This application is a continuation of U.S. patent application Ser. No. 14/367,082, entitled "TECHNIQUES FOR OPERATING A STORAGE NETWORK SYSTEM," filed Jun. 19, 2014, which is a national stage of International Application No. PCT/JP2012/075323, entitled "STORAGE NETWORK SYSTEM," filed Oct. 1, 2012, which claims priority to Japanese Patent Application No. 2011-277801, filed Dec. 20, 2011. The disclosure of U.S. patent application Ser. No. 14/367,082 is hereby incorporated herein by reference in its entirety for all purposes.

BACKGROUND

The disclosure relates to a storage network system and, more specifically, to techniques for operating a storage network system.

For a mobile body, such as a portable terminal or a vehicle equipped with a sensor, there is a need to store, in a storage device (storage), sensor data detected by the sensor in chronological order. Since the sensor data increases as the mobile body moves, it is difficult to store all the sensor data in a storage having a finite storage capacity. Further, when all sensor data are stored only in a specific storage, there is a possibility that all the sensor data may be lost due to a problem with the storage or the like. Therefore, the selection of sensor data to be stored in the storage or the transfer (transmission) of data to an external storage has been conventionally performed.

Japanese Patent Application Publication No. 2000-41957 discloses a health control system in which, when a health-controlling person comes close to a terminal device, health data measured by health measuring equipment is automatically transferred to the terminal device together with information for identifying the health measuring equipment. In the health control system, many terminal devices are connected to a public network, and health data stored in health measuring equipment are extracted by any terminal device and transferred to a terminal device (e.g., a terminal device located at a home position) usually used by a health-controlling person.

BRIEF SUMMARY

A technique for operating a storage network system includes storing, at one or more of a plurality of data collection storages arranged along a traveling path of a mobile body, data records received from the mobile body. An acknowledge (ACK) record including a storage identifier (ID) is transmitted, from the one or more of the plurality of data collection storages to the mobile body, in response to receiving the data records. Communication between a user storage and the one or more of the plurality of data collection storages is established via a communication network that is configured to receive the ACK record and receive and store at least one of the data records from the one or more of the data collection storages that is identified by the storage ID in the received ACK record.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The description of the illustrative embodiments is to be read in conjunction with the accompanying drawings, wherein.

DETAILED DESCRIPTION

The illustrative embodiments provide a method, an apparatus, and a computer program product configured to search a storage network system for data received from a mobile body.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

It should be understood that the use of specific component, device, and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized. As may be used herein, the term 'coupled' may encompass a direct connection between components or elements or an indirect connection between components or elements utilizing one or more intervening components or elements.

The system in Japanese Patent Application Publication No. 2000-41957 discloses transferring health data automatically to a terminal device located at a home position of a health-controlling person, but does not disclose allowing a user to use one terminal device in order to search for and selectively acquire necessary data from data stored in another terminal device.

According to the present disclosure, a storage network system is disclosed that is capable of searching for and selectively acquiring necessary data from data stored in each storage while storing data acquired by a mobile body in external storages sequentially along with the traveling of the mobile body.

In one embodiment a storage network system includes: multiple data collection storages arranged along a traveling path of a mobile body with each of the data collection storages storing data records received from a mobile body and transmitting, to the mobile body, an acknowledge (ACK) record that includes a storage identifier (ID) in response to receiving the data records; and a user storage communicable with the multiple data collection storages through a communication network. The user storage is configured to receive the ACK record, and receive and store at least one of the data records from at least one of the data collection storages that is identified using the storage ID in the received ACK record.

In at least one embodiment, data acquired by the mobile body are stored in multiple external data collection storages along with the traveling of the mobile body so that a user can selectively later acquire necessary data from data stored in each of the data collection storages.

In one embodiment, a communication network includes multiple cloud storages communicable with the multiple data collection storages and the user storage, where each cloud storage can store the data record received from at least one of the multiple data collection storages and mutually exchange the data record with the other cloud storages.

According to one aspect, a user can selectively acquire necessary data from data stored in the multiple data collection storages only by communicating with at least one of the cloud storages on the communication network. In another aspect, the mobile body includes a local storage for storing the data record and the ACK record and the local storage functions as a part of a storage network system. The mobile body can, for example, travel while sequentially storing a record (log) indicating that the transmitted data record is stored in a data collection storage. In still another aspect, each of the multiple data collection storages receives, from the mobile body, and stores the ACK record stored in the local storage individually or together with the data record. The data collection storage can, for example, store not only the data record but also the ACK record to reduce the storage amount of data record and ACK record in the local storage of the mobile body.

In yet another aspect, each neighboring one of the multiple data collection storages receives, from the mobile body, the data record as a part of a series of data. According to one aspect, since the series of data can be stored in multiple data collection storages in a distributed manner, even when a part of data is lost due to a problem with the storage in the mobile body or some of the data collection storages the damage caused by the loss can be reduced and, hence, the protection of data can be maintained and promoted. In yet another aspect, the data record includes information on a data marker, a mobile body ID, data, a data generation position, and a data generation time and the ACK record includes information on an ACK marker, a data generation position, and a data generation time in addition to the storage ID. In still another aspect, user storage receives, from the multiple data collection storages, all data records including any selected one of the pieces of information on the mobile body ID, the data generation position, and the data generation time.

According to one aspect, all pieces of data regarding a specific parameter can be selectively collected from the multiple data collection storages. In yet another aspect, each of the multiple data collection storages receives either or both of the data record and the ACK record while the mobile body capable of performing radio communication is stopped or traveling at a predetermined speed or lower. According to one aspect, broadband radio communication for the transfer of a large amount of data can be used and a predetermined amount of data can be exchanged even in a short time such as in a brief stop of the mobile body.

Figure 1:
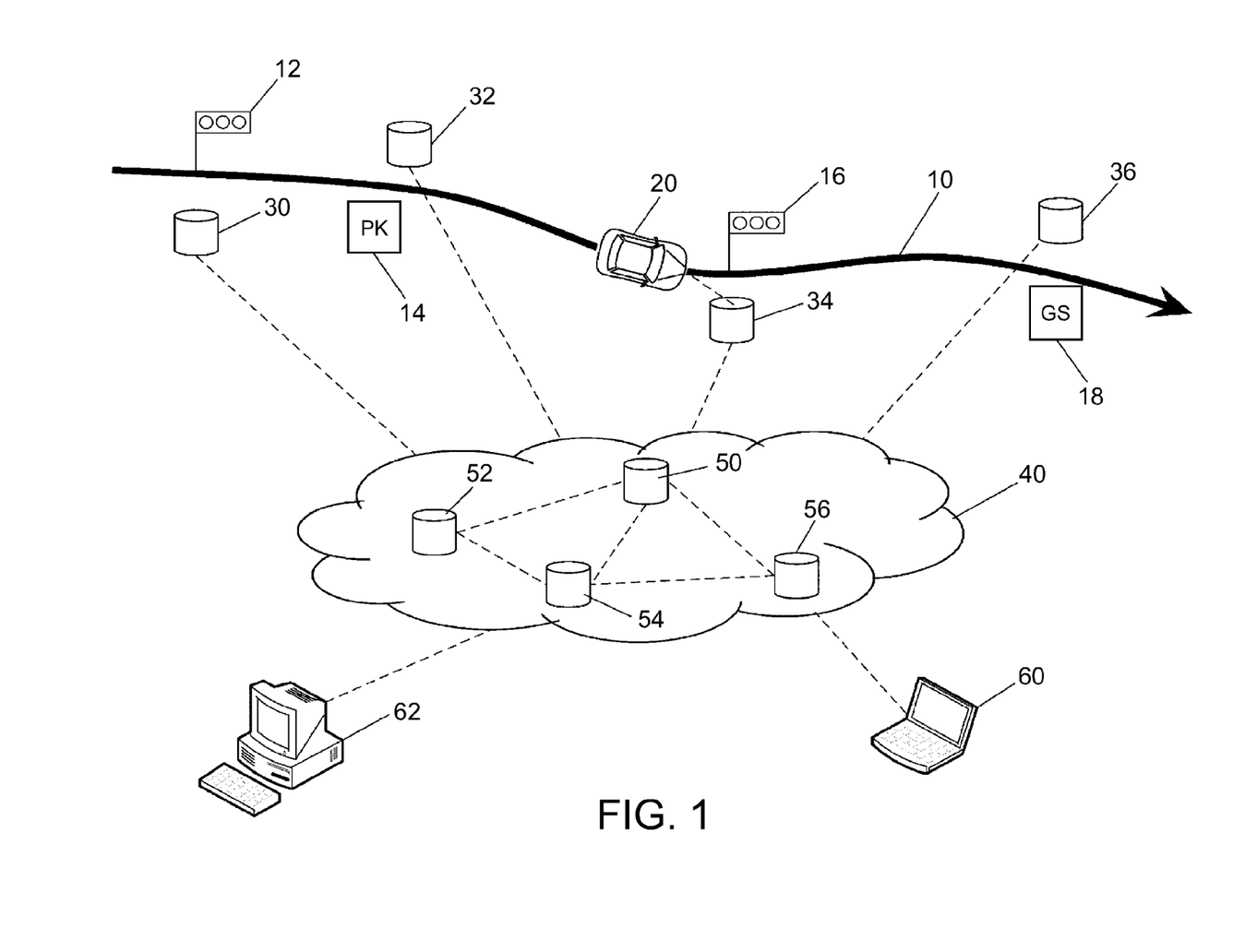
FIG. 1 is a diagram showing a configuration example of a storage network system according to the present disclosure.

FIG. 1 is a diagram showing a configuration example of a storage network system 100. FIG. 1 illustrates a case where a vehicle 20 as a mobile body travels (runs) on a road 10. The vehicle 20 can be a two-wheel motorcycle or a bicycle, as well as a four-wheel car. Further, a person other than the vehicle 20 may also be the mobile body. Facilities such as traffic lights 12 and 16, parking (PK) 14, and a gas station (GS) 18, at which the vehicle 20 stops or slows down, are installed along the road 10. It should be noted that the term "storage" as used in the present disclosure means a device equipped with not only storage (a hard disk drive (HDD), tape drive, semiconductor memory, or the like) for simply storing data, but also the functions of managing stored data and exchanging data. A specific configuration is described below.

The storage network system 100 includes multiple data collection storages 30, 32, 34, and 36 arranged along the road 10, a communication network 40, and user storages 60 and 62. The vehicle 20 includes a local storage (310 or 370 in FIG. 2), and the local storage can function as a part of the storage network system 100. The data collection storages 30 to 36 are installed near the locations of the facilities, such as the traffic lights 12 and 16 illustrated in FIG. 1, where the vehicle 20 stops or slows down.

The communication network 40 includes multiple cloud storages 50, 52, 54, and 56 communicable with the multiple data collection storages 30 to 36 and the user storages 60 and 62. Each cloud storage can mutually communicate with the other cloud storages. In FIG. 1, each of the broken lines denotes a communication path. The communication path can be configured by either radio or wire. The communication between the local storage of the vehicle 20 and each data collection storage is usually radio communication, but a communication cable at the parking (PK) 14 or the gas station (GS) 18 may be employed.

An overview of communication between respective storages in the storage network system 100 of FIG. 1 is as follows: The vehicle 20 stores, in the local storage, sensor data detected by various internal sensors while traveling. The vehicle 20 stops in front of the traffic light 16, and transmits sensor data accumulated in the local storage to a neighboring data collection storage 34 by radio communication. The format of the transmitted sensor data is described in further detail below. In this case, since the vehicle 20 is at a stop, broadband radio communication can be used for the transfer of a large amount of data at a short distance. The vehicle 20 can transmit sensor data even while traveling slowly at a predetermined speed or lower (e.g., 10 km/h or less) as well as during a complete stop. Thus, a predetermined amount of sensor data can be transmitted collectively even in a short time, such as when the vehicle 20 is stopping at a red light. Sensor data that cannot be transmitted at a time is transmitted to a next data collection storage (e.g., the storage 36 in FIG. 1) on the way of traveling. Thus, sensor data can be stored in each data collection storage in a distributed manner and this can guarantee the redundancy and security of data storage.

The data collection storage 34 that received sensor data stores the sensor data and transmits, to the local storage of the vehicle 20, ACK data indicative of the reception at the same time. The format of the transmitted ACK data is described in further detail below. The local storage of the vehicle 20 stores the received ACK data. After receiving the ACK data, the local storage can delete the sensor data transmitted. This can reduce the amount of sensor data stored in the local storage to avoid an overflow situation.

The data collection storage 34 accumulates received sensor data and transmits the accumulated sensor data to a cloud storage (e.g., the storage 50) in the communication network 40 as necessary or at predetermined timing. Here, "as necessary" means, for example, the time when a data transmission request is made from a user storage 60 or 62 through the communication network 40. The "predetermined timing" means, for example, every preset interval of time or timing for each amount of accumulated data.

The cloud storage (e.g., the storage 50) can store the received sensor data and transmit the stored sensor data to another cloud storage (e.g., the storages 54 or 56) in the communication network 40 as necessary or at predetermined timing. Here, the meanings of "as necessary" and "predetermined timing" are the same as those mentioned above. In this case, a specific cloud storage may be recognized as a so-called data center at which sensor data from each cloud storage, namely from each data collection storage, are collectively accumulated (copied). This enables a prompt response to the data transmission request from the user storage 60 and 62. The user storages 60 and 62 communicate with cloud storages (e.g., storages 54 and 56) in the communication network 40 to search for and receive necessary sensor data stored in respective data collection storages or the cloud storages.

Figure 2:
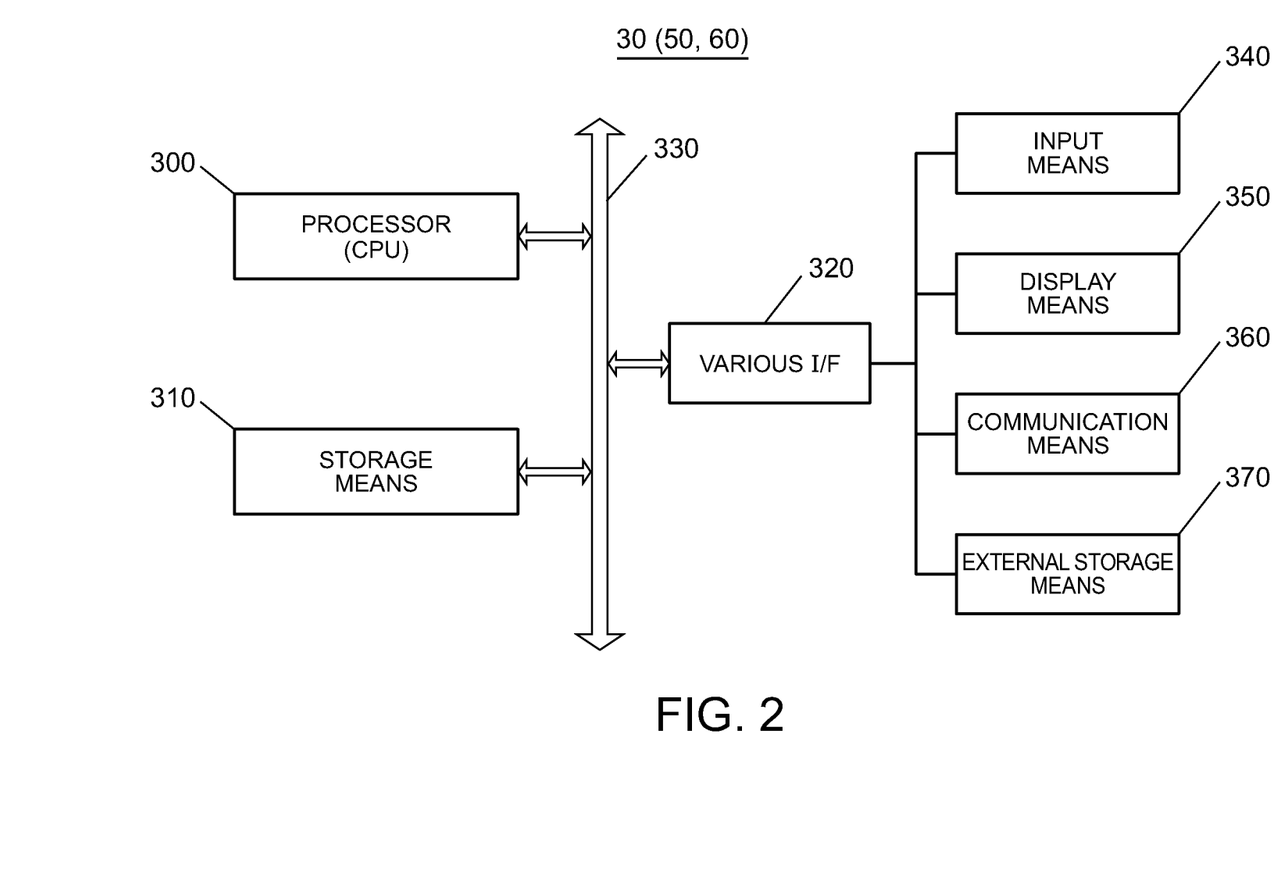
FIG. 2 is a block diagram showing a configuration example of each storage according to the present disclosure.

FIG. 2 is a block diagram showing a basic configuration example of each disclosed storage, i.e., each of the data collection storages 30 to 36, the cloud storages 50 to 56, the user storages 60 and 62, and the local storage in the vehicle 20. Each storage includes a central processing unit (CPU) or processor 300, storage device 310, and various interfaces (I/F) 320, which are connected to each other through a bus 330. The various I/F is used as a generic term that includes an input I/F, an output I/F, an external storage I/F, an external communication I/F, and the like. Each I/F is connected through a universal serial bus (USB) or a local area network (LAN) to corresponding input device 340, such as a keyboard, a mouse, or a numerical keypad, display device 350, such as a cathode ray tube (CRT) or an LCD, communication device 360, and external storage device 370 such as a semiconductor memory, a hard disk drive (HDD), or a tape drive.

The storage device 310 includes semiconductor memories such as a random access memory (RAM) and a read-only memory (ROM), an HDD, and the like. The storage device 310 can set multiple memory sections (storage sections) according to the targets (data) to be stored. For example, in the case of a local storage or a user storage, the storage can be divided into storage sections for sensor data and ACK data to manage data in respective sections. In this case, two storage devices can be physically provided, or two storage areas can be set in one storage device.

The processor 300 executes predetermined software to manage and control data stored in the storage device 310 and data exchanged through the communication device 360, and to control information input by the input device 340 and information to be displayed on the display device 350. The processor 300 in a local storage also has the function of controlling various sensors to acquire sensor data and store, in the storage device 310, the sensor data in a predetermined data format.

Figure 3:
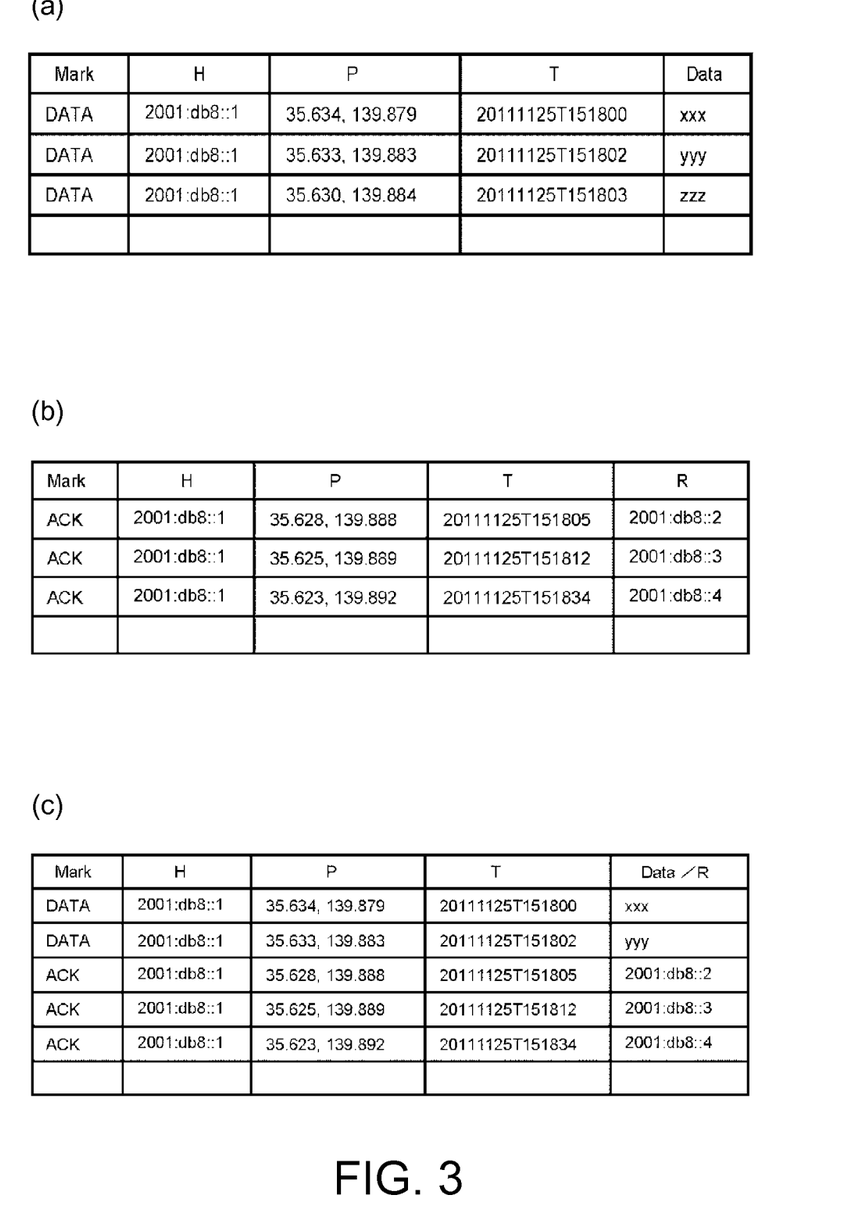
FIG. 3 is a diagram showing structure examples of data records and acknowledge (ACK) records according to the present disclosure.

Referring to FIG. 3, tables showing structure examples of data records and ACK records according to the present disclosure are illustrated. Sensor data and ACK data are generally stored in each storage as data records and ACK records and exchanged between respective storages. FIG. 3(*a*) shows the format of data records in one embodiment. Each data record is made up of a 'mark' indicative of the type, i.e., data or ACK, a data owner 'H', a data generation (acquisition) position (latitude, longitude) 'P', a data generation (acquisition) time 'T', and a generated (acquired) sensor data 'Data'. The data record can be indicated as (data, H, P, T, D). Each data record may be accumulated sequentially in a storage section dedicated to sensor data (data record) in the storage device 310.

FIG. 3(*b*) illustrates the format of ACK records in one embodiment. Each ACK record is made up of a 'mark' indicative of the type, i.e., data or ACK, a data owner 'H', a data generation (acquisition) position (latitude, longitude) 'P', a data generation (acquisition) time 'T' and a storage ID 'R'. For example, an IP address (IPv6 or the like) used on the Internet can be used as the storage ID. However, the storage ID is not limited thereto, and it can be set according to any standard as long as one unique ID is assigned to each storage. The ACK record can be indicated as (ACK, H, P, T, R). Each ACK record may be accumulated sequentially in a storage section dedicated to ACK data (ACK record) in the storage means 310.

FIG. 3(*c*) shows an example in which data records and ACK records are mixed and accumulated sequentially in one storage section of the storage device 310. In this case, the ACK records are integrated with the data records, i.e., the ACK records are stored and exchanged in the same manner as the data records. When the capacity of the storage section dedicated to the ACK data in the storage device 310 is becoming full, or when the capacity exceeds a predetermined storage capacity, if the ACK records are to be stored sequentially in the storage section dedicated to the sensor data, the ACK records may be stored and exchanged in a format shown in FIG. 3(*c*). It should be noted that the formats of data records and ACK records illustrated in FIG. 3 are just an example and formats in which any other parameter is added or a parameter is changed to another can be employed according to the type and characteristics of sensor data.

Figure 4:
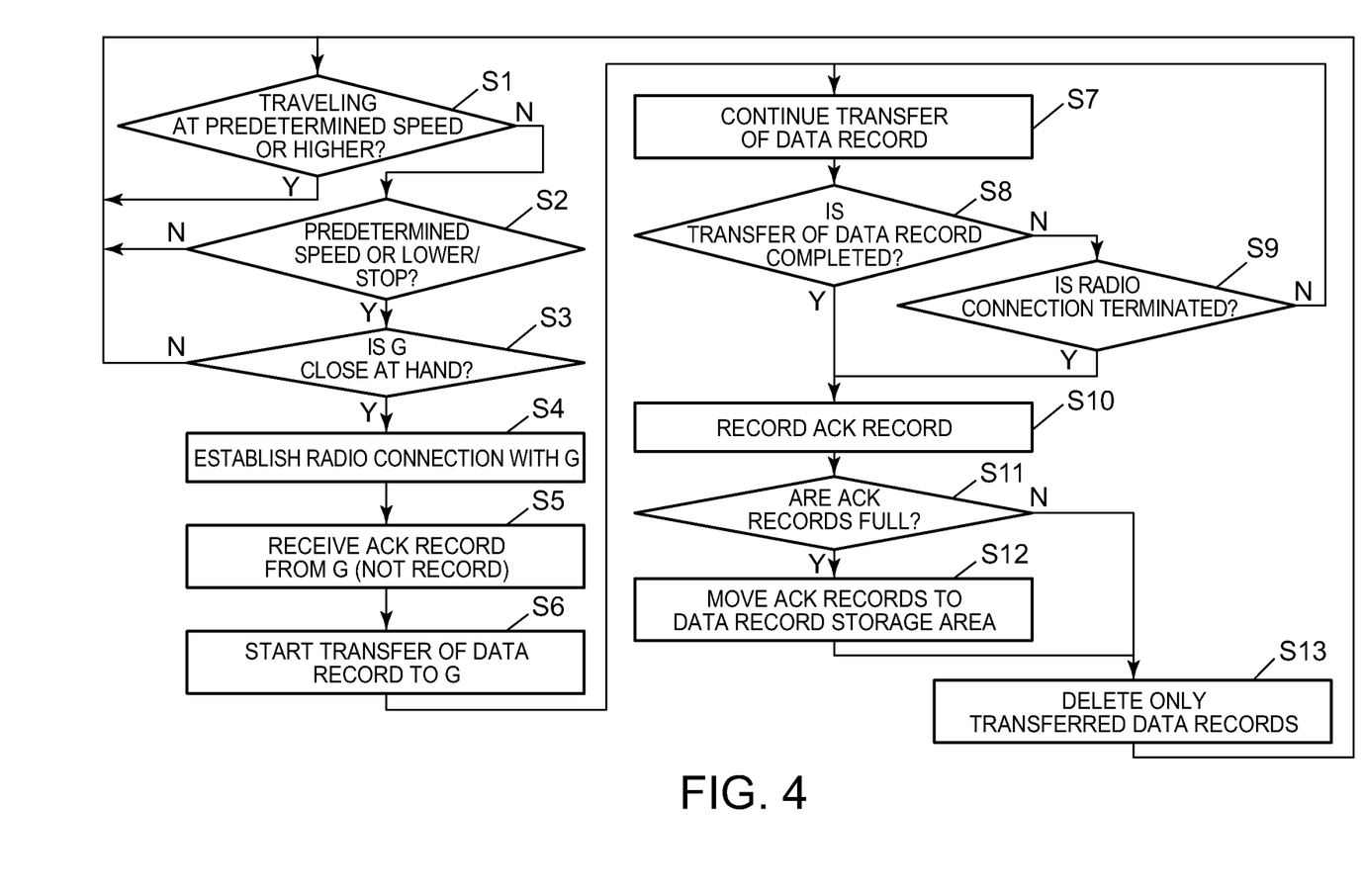
FIG. 4 is a chart showing an example of a processing flow in a local storage according to the present disclosure.
Figure 5:
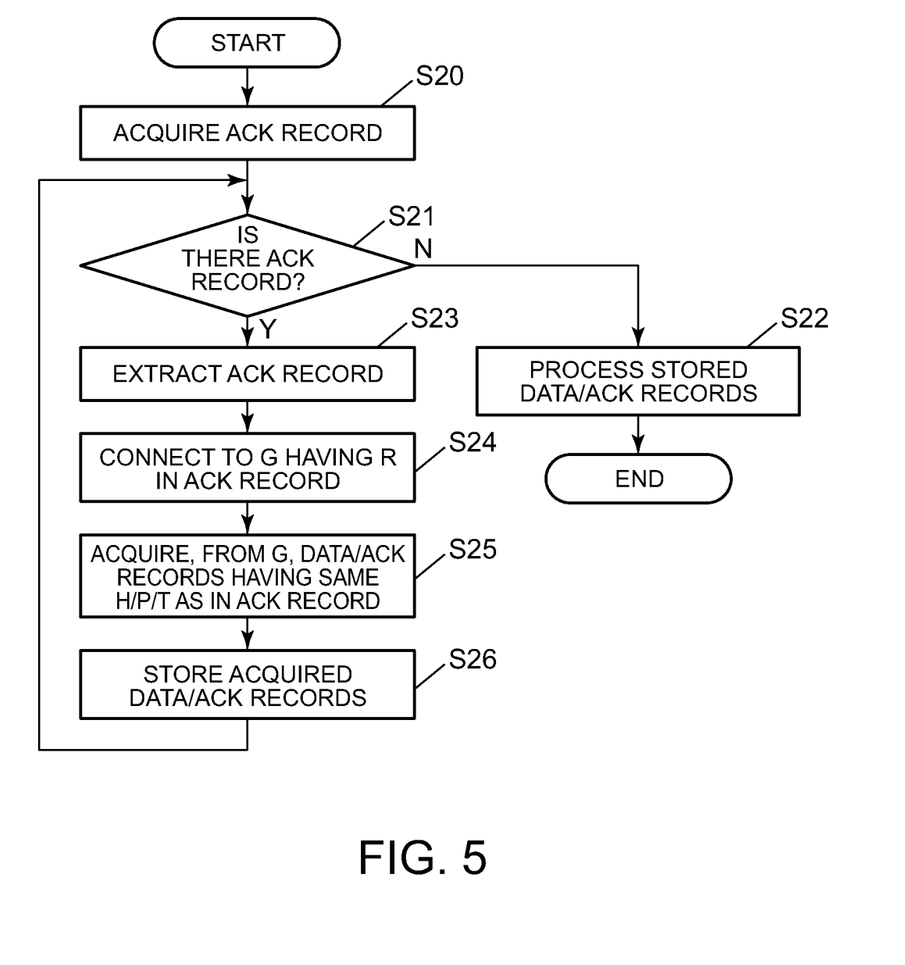
FIG. 5 is a chart showing an example of a processing flow in a user storage according to the present disclosure.

Referring next to FIG. 4 and FIG. 5, a processing flow according to the present the disclosure is illustrated. FIG. 4 is a flowchart showing an example of a processing flow in a local storage. FIG. 5 is a flowchart showing an example of a processing flow in a user storage. The flow of each chart may be carried out by using predetermined software executed by the processor 300 of a corresponding storage.

In block S1 of FIG. 4, it is determined whether a mobile body (e.g., vehicle 20 in FIG. 1) is traveling at a predetermined speed or higher. The predetermined speed means such a relatively fast speed that it is obvious that broadband radio communication for the transfer of a large amount of data at a short distance cannot be used. When this determination is No, i.e., when the mobile body is at a speed lower than or equal to the predetermined speed, it is determined in the following block S2 whether the mobile body is at a speed lower than or equal to the predetermined speed or at a stop. The predetermined speed may be, for example, 10 km/h or less as already exemplified, which is set as such a speed that broadband radio communication can be used for the transfer of a large amount of data at a short distance. This state corresponds to such a state that the vehicle 20 comes close to the traffic light 12, 16 and hence slows down or is at a stop in the example of FIG. 1. It should be noted that blocks S1 and S2 may be determined at one time as one block.

When the determination in block S2 is Yes, it is determined in the following block S3 whether a data collection storage G (e.g., 30-36 in FIG. 1) is close at hand. Specifically, for example, the determination is made by calculating, e.g., using a global positioning system (GPS), the position of the data collection storage G, already registered on a map database for navigation and distance to the mobile body to determine whether the distance is within a predetermined distance or whether a predetermined signal transmitted from the data collection storage G can be received with a predetermined receiving sensitivity or higher. When this determination is Yes, radio connection with the data collection storage G is established in the following block S4. After the radio communication is established, an ACK record is received in block S5 from the data collection storage G. The contents of the ACK record may include, as already mentioned, an ACK record including position P at which the radio communication is established, time T, ID of the data collection storage G, and the like. The ACK record may be temporarily held in a DRAM or the like without being held in the storage device, as the ACK record is generally stored after completion of the transmission (transfer) of data records is confirmed in a subsequent block.

In block S6, the transfer of a data record toward the data collection storage G is started. The contents of the data record may include, for example, a data record including position P at which sensor data is generated (acquired), time T, sensor data D. In block S7, the transfer of data records toward the data collection storage G is continued. Typically, the data records are transmitted sequentially. It should be appreciated that data records to be transmitted may not be all data stored in the storage device and the data records can be transmitted in units of predetermined data arbitrarily selected.

In the following block S8, it is determined whether the transfer of data records to the data collection storage G is complete. When this determination is Yes, the ACK record received and temporarily held in block S5 is stored in the storage device in block S10. When the determination in block S8 is No, it is determined in block S9 whether the radio communication with the data collection storage G is terminated. When this determination is No, the procedure returns to block S7 to continue the transfer of data records. When the determination in block S9 is Yes, the procedure moves to block S10 to store the temporarily held ACK record in the storage device in the same manner.

In block S11, it is determined whether ACK records stored in the storage device (storage area) for ACK records are full, or more than or equal to a predetermined capacity. The image of this determination is that it is determined whether accumulated tabulated data of ACK records in FIG. 3(*b*) already described become full and hence there is no room for a further ACK record to enter. When this determination is Yes, the ACK records are moved to the storage device (storage area) for data records in block S12. The image of ACK records after this movement is such a state that the data records and the ACK records in FIG. 3(*c*) already described are mixed and accumulated in one storage device (storage area). When the determination in block S11 is No, or after processing in block S12, data records transferred (transmitted) to the data collection storage G are deleted from the storage area in block S13. This can reduce the storage amount of data in the storage device (storage area) for data records.

Turning to the description of FIG. 5, a user storage (e.g., the storage 60 or 62 in FIG. 1) acquires an accumulated ACK record from the local storage or a cloud storage in block S20. Specifically, the user storage acquires the ACK record through radio or wire communication from the local storage of the mobile body or the cloud storage to which the ACK record is transferred from the data collection storage G. For example, from the local storage of the mobile body, the ACK record is acquired (copied) by file sharing within the storage through a wireless LAN or via a storage medium such as a USB memory. If there exists a public cloud storage for collecting and distributing an ACK record, the ACK record may be acquired from the public cloud storage. In this case, for example, the ACK record can be acquired by using HTTP download as a trigger like a PDF read in a web browser.

In block S21, it is determined whether there is an ACK record newly acquired from the local storage. When this determination is No, desired processing is performed in block S22 on data records and ACK records already stored in the storage device of the user storage. Specifically, necessary data is extracted from each record to perform statistical processing, analytical processing, and the like, on time-series sensor data.

When the determination in block S21 is Yes, the ACK record acquired and stored in the storage device is extracted (called) in block S23. After the extraction, the ACK record can be deleted from the storage device. In block S24, the user storage connects to (accesses) a storage having the storage ID (R) in the extracted ACK record (ACK, H, P, T, R), i.e., to the data collection storage G through a communication network (40 in FIG. 1), more specifically, via a cloud storage (50-56 in FIG. 1) within the communication network.

In the following block S25, ACK records and data records having at least any one of, or two or more of H, P, and T identical to the H (data owner), P (data acquisition position), and T (data acquisition time) in the extracted ACK record (ACK, H, P, T, R) are acquired from the data collection storage G. At this time, the records to be acquired are searched for (identified) by using a wild card (*). Here, the wild card (*) means that all data of parameters indicated by (*) match (become acquisition targets). For example, when all sensor data on owner H1 of certain data are acquired, (data, H1, *, *, *) is used as a kind of search command to acquire all data records that match this command. On the other hand, when all sensor data on certain position P1, (data, *, P1, *, *) is used as a search command to acquire all data records that match this command.

As previously mentioned, there may be a case when data records that match these commands are stored in any one of cloud storages (the storages 50 to 56 in FIG. 1) after being transferred from the data collection storage G. In such a case, corresponding data records can be acquired from the cloud storage. In this case, however, the storage ID (R) in the ACK record needs to be changed to the ID of the cloud storage after the transfer. To that end, for example, it is necessary for the user storage to transmit, to a cloud storage C to communicate, an ACK record including an identified storage ID (R1) of the data collection storage G, and for the cloud storage C to change the storage ID (R1) to an ID (R2) of a cloud storage C1 and transmit the ACK record to the user storage. This enables the user storage to receive data records from the cloud storage C instead of the data collection storage G. As a result, the time for the user storage to acquire (collect) data can be reduced.

In the following block S26, the acquired data records and the ACK record are stored in the storage device, and used for statistical processing, analytical processing, and the like, on time-series sensor data in block S22 that can be executed after the procedure returns to block S21. Further, in the return loop, the ACK record acquired in block S26 can be used to perform processing from blocks S21 to S25 in the same manner.

It is noted that the present invention is not restricted to the above-described embodiment; a variety of modifications and improvements are possible within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method of operating a storage network system having a plurality of data collection storages, comprising:
   identifying, by a computing system associated the storage network system and coupled to a mobile body traveling along a transportation path at a speed below a threshold speed, a geographical location of one or more data collection storages of the plurality of data collection storages arranged along the transportation path:
   determining, by the computing system and based on the speed of the mobile body and the geographical location, that short range wireless communication can be established between the mobile body and the one or more data collection storages:
   transmitting, from the computing system to the one or more data collection storages using short range wireless communication, one or more data records for storing by the one or more data collection storages, wherein the one or more data records are received from at least one sensor of the mobile body;
   receiving, from the one or more data collection storages, an acknowledge (ACK) record including a storage identifier (ID) in response to transmitting the one or more data records;
   establishing, by the one or more data collection storages, communication with a user storage via a communication network, wherein the user storage is configured to receive the ACK record and receive and store at least one of the data record from the one or more data collection storages identified by the storage ID in the received ACK record; and
   receiving, at the user storage, the ACK record from the computing system.

2. The method of claim 1, wherein the communication network includes a plurality of cloud storages in communication with the plurality of data collection storages and the user storage, and wherein each of the cloud storages is configured to store one or more of the data records received from at least one of the plurality of data collection storages and mutually exchange the one or more of the data records with other ones of the cloud storages.

3. The method of claim 1, wherein the mobile body includes a local storage for storing one or more of the data records and the ACK record, and wherein the local storage functions as a part of the storage network system.

4. The method of claim 3, wherein each of the plurality of data collection storages receives, from the mobile body, and storages the ACK record stored in the local storage individually or together with one of the data records.

5. The method of claim 4, wherein each of the plurality of data collection storages receives at least one or both of one or more of the data records and the ACK record while the mobile body is at a stop or traveling at a predetermined speed or lower.

6. The method of claim 1, wherein each neighboring one of the plurality of data collection storages receives, from the mobile body, one or more of the data records as a part of a series of data.

7. The method of claim 1, wherein each of the data records includes a data marker, a mobile body ID, data, a data generation position, and a data generation time, and wherein the ACK record includes an ACK marker, a data generation position, and a data generation time in addition to the storage ID.

8. The method of claim 7, wherein the user storage receives, from the plurality of data collection storages, all of the data records including any selected one of the mobile body ID, the data generation position, and the data generation time.

* * * * *